United States Patent

[11] 3,554,332

| [72] | Inventor | Anthony William Harrison Birmingham, England |
|---|---|---|
| [21] | Appl. No. | 713,741 |
| [22] | Filed | Mar. 18, 1968 |
| [45] | Patented | Jan. 12, 1971 |
| [73] | Assignee | Girling Limited |
| [32] | Priority | Mar. 21, 1967 |
| [33] | | Great Britain |
| [31] | | 13,282/1967 |

[54] VEHICLE BRAKES
7 Claims, 13 Drawing Figs.

[52] U.S. Cl............................................. 188/79.5, 188/106, 188/196, 188/216
[51] Int. Cl........................................F16d 51/70, F16d 65/56
[50] Field of Search............................................ 188/78W, 79.5, 66, 6T, 196RR, 216, 106A, 106F

[56] References Cited
UNITED STATES PATENTS

| 2,292,017 | 8/1942 | Smith............................ | 188/79.5(B) |
| 3,203,512 | 8/1965 | Lepelletier.................... | 188/216X |
| 2,945,564 | 7/1960 | House et al.................... | 188/106(A)X |
| 3,323,618 | 6/1967 | Riddy............................ | 188/106(F)X |

FOREIGN PATENTS

| 1,438,924 | 4/1966 | France......................... | 188/216 |

Primary Examiner—Duane A. Reger
Attorney—Scrivener, Parker, Scrivener & Clarke

ABSTRACT: The invention is concerned with several principal constructional features of internal shoe drum brakes, these principal features being combined in the brake of FIGS. 3 to 6 of the drawings.

Figure 5:
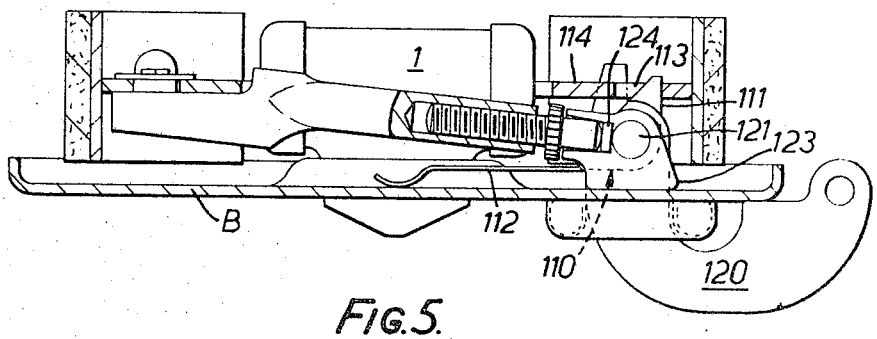

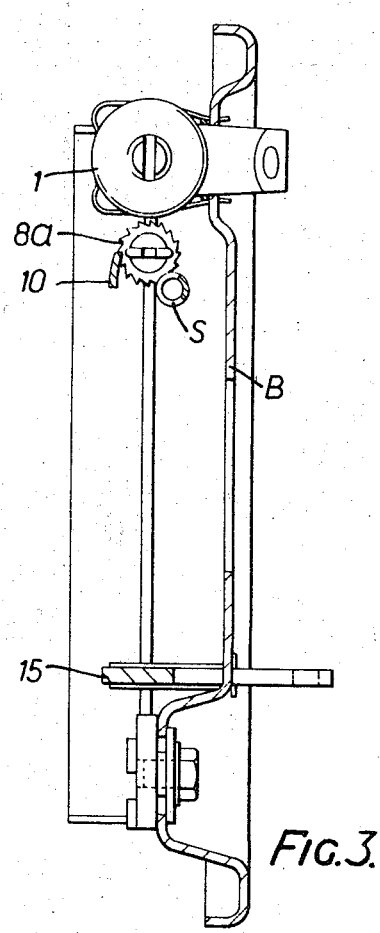
Fig.3.
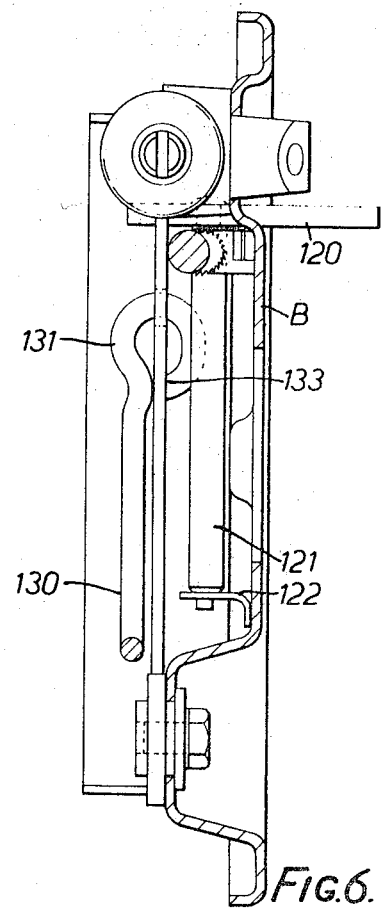
Fig.6.
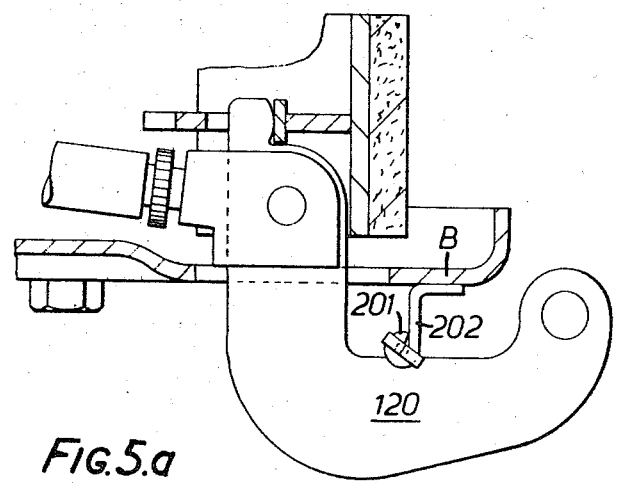
Fig.5.a
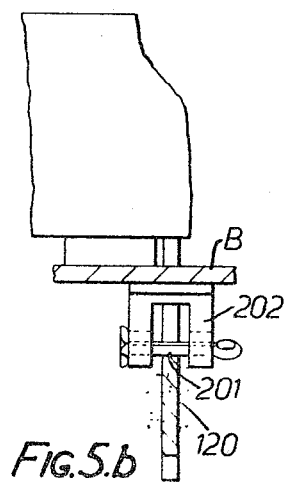
Fig.5.b

VEHICLE BRAKES

One feature is the provision of an automatic slack adjuster in the form of a strut acting to transmit manual loads between two brake shoes. A threaded adjuster for the strut is actuated by a pawl and ratchet only when a power actuated service brake is applied to relieve the strut of the load imposed on it by the shoe return spring. This ensures frequent adjustment as required, whereas reliance upon auxiliary (manual) brake actuation may not keep the brake fully adjusted.

Secondly, a third order lever is used to transmit manual loads from an actuating lever to the strut, thus enabling the lever to be positioned close to the tip of one shoe, to provide greater stability under braking conditions.

Thirdly, the return spring means are specially designed to provide a hold down force independent of the retraction force. This is achieved by shaping the ends of the return spring means so that they apply to each shoe a couple about an axis parallel with the back plate.

This invention relates to vehicle brakes, and is concerned with several novel constructional features of internal shoe drum brakes.

One such feature is the construction and arrangement of an automatic adjuster, to compensate for wear of the friction pads in a brake having a service brake actuator and manually actuated brake applying means such as a parking brake or an emergency brake. More particularly, the invention relates to brakes of this general construction in which the manually applied load (but not the service brake load) is transmitted to a friction element by a strut of adjustable length comprising a pair of members screwed together, and pawl and ratchet means are provided for effecting relative rotation of the said members to adjust the length of the strut in response to excessive travel of the friction element upon brake actuation.

In the known constructions of which we are aware, adjustment is effected against frictional loads arising from the action of the brake return spring or springs, but in accordance with a feature of the present invention, relative rotation of the two members forming the strut is only effected while the strut is relieved of such frictional loads by operation of the service brake actuator. This arrangement ensures that the braking effort available is not materially reduced by the torque required to effect adjustment.

Another feature of the invention resides in the provision of an internal shoe drum brake comprising a pair of brake shoes, power actuated service brake means for expanding the shoes against the drum, and manually actuated auxiliary brake applying means comprising an actuating lever connected to one shoe and a strut for transmitting auxiliary actuating forces to the other shoe, wherein the said lever pivots about an axis transverse to the axis of the brake drum, and forces are transmitted from the lever to the strut through the intermediary of a third order lever.

With this arrangement it becomes possible to position the lever nearer one end of the said one shoe than would otherwise be the case, leading to greater stability under braking conditions and reducing the tendency for the brakes to exhibit the phenomenon known as "grab".

The invention is also concerned with an improved form of shoe return spring for an internal drum brake in which a brake return spring is arranged to prevent the shoes from moving away from the brake back plate. In accordance with the present invention, this effect (usually known as "holddown") may be enhanced by so shaping the opposite ends of the shoe return spring and connecting them to the shoes that a couple is applied to each of the shoes by the adjacent end portion of the spring.

Figure 1:
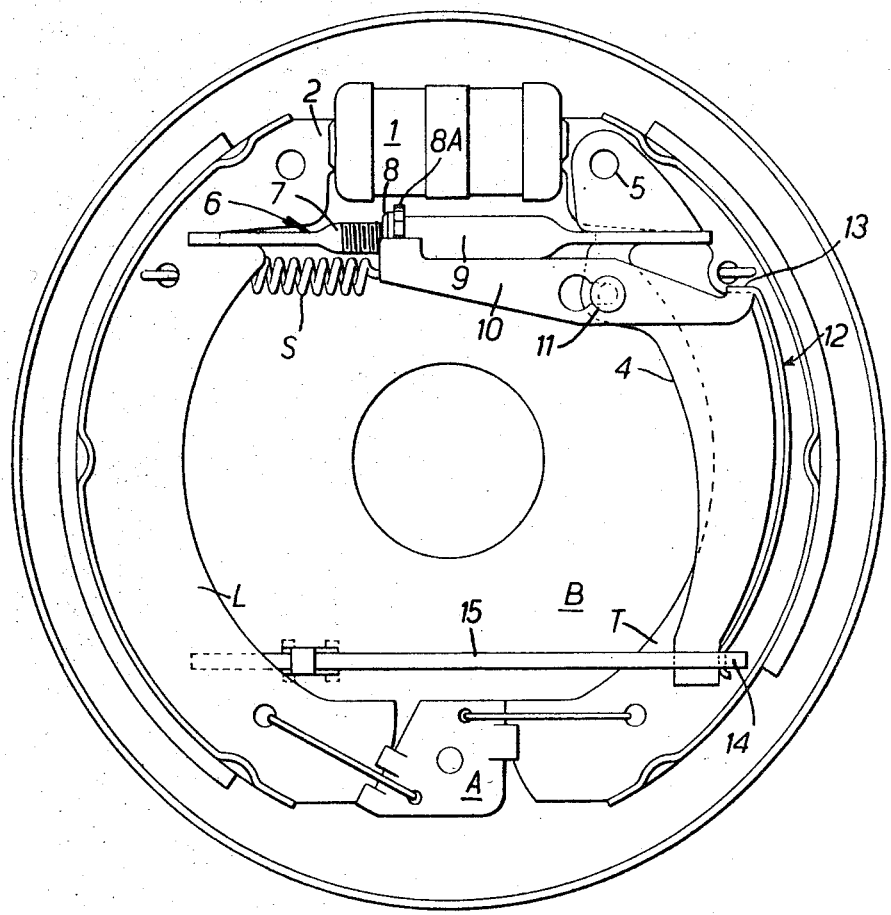
Figure 2:
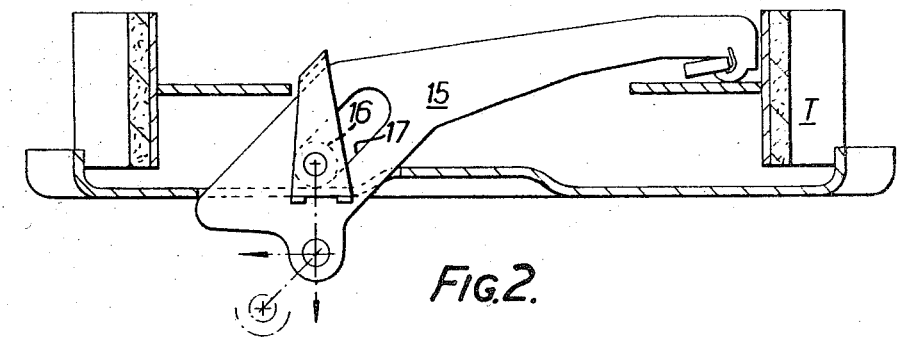
Figure 4:
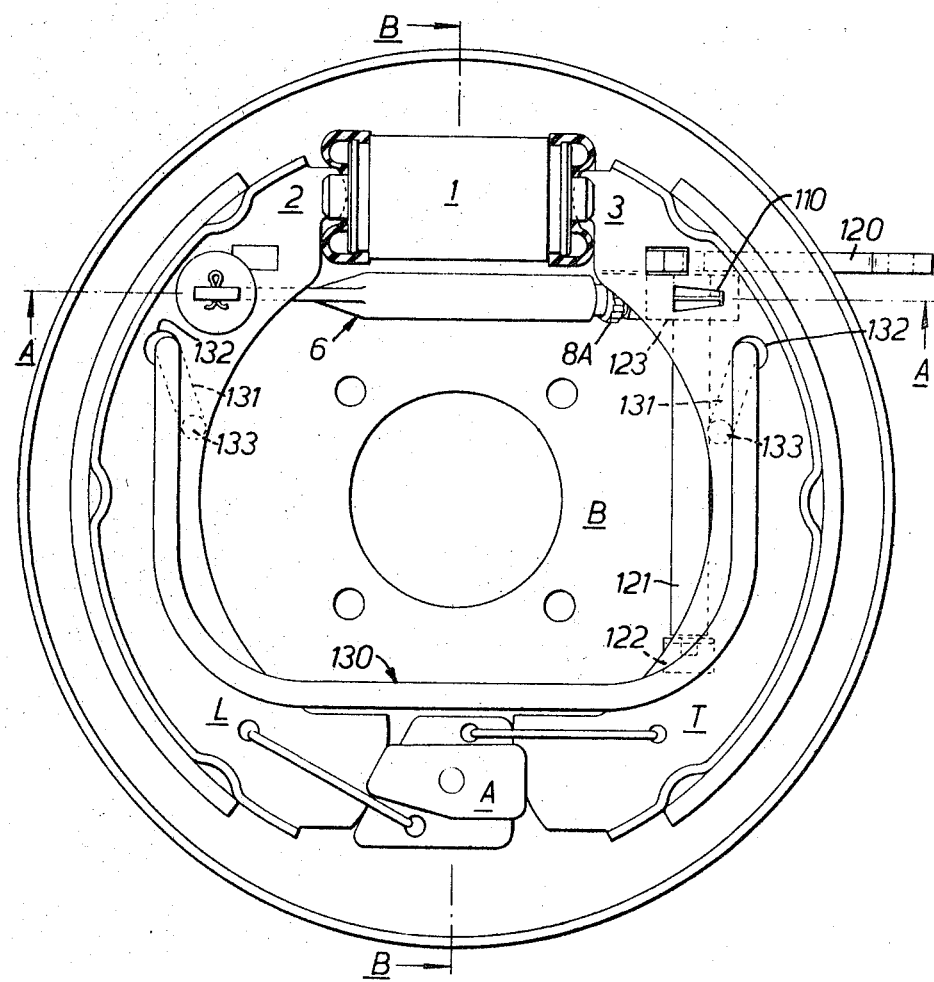

Two forms of drum brake (and some possible modifications) in accordance with the invention will now be described, by way of example only, with reference to the accompanying drawings, in which:

FIG. 1 is a side elevation of one form of brake;
FIG. 2 is a bottom plan view of the brake of FIG. 1;
FIG. 3 is a sectional elevation of the brake of FIG. 1;
FIG. 4 is a side elevation of the second form of brake;
FIGS. 5 and 6 are sections of the lines 'AA' and 'BB', respectively, of FIG. 4;
FIGS. 5A and 5B show a detail modification; and
FIGS. 7 to 11 illustrate some other modified details.

The two brakes illustrated have several features in common which are designated by the same reference numerals or letters.

Each brake comprises a back plate B, a pair of brake shoes L and T, a fixed abutment A and a double ended brake slave cylinder 1 for applying the service-braking load to the adjacent tips 2 and 3 of the shoes L and T, respectively.

Referring now to FIGS. 1 to 3, the auxiliary (parking) brake load is applied by a lever 4 pivoted to the trailing shoe T at the fulcrum 5. The lever also engages a strut 6 comprising a screw 7, a nut 8 formed with a ratchet wheel 8A and a tube 9. Arranged for cooperation with the ratchet wheel 8A is a pawl 10 pivoted to the lever 4 by a fulcrum pin 11. The pawl is biased in the clockwise direction by a spring arm 12, this rotation being limited by a stop 13 on the lever 4. The free end of the arm engages a link 15 of the auxiliary actuation linkage, the reaction being taken by a roller 16 journaled on a fixed axis and engaging in an inclined slot 17 in the link 15. The link is designed to permit an actuating force to be applied over a wise range of directions, ranging between parallel with the back plate and normal to it, the roller and inclined slot serving to resolve such forces in a direction parallel with the back plate.

When the auxiliary brake is applied, the lever 4 is pivoted radially inwardly of the drum, and the leading shoe L is forced outwardly by the strut 6. The reaction at the fulcrum 5 causes the trailing shoe T to be forced out in similar manner. During this operation, the brake return spring (indicated at S) is still acting on the shoes, and and the resulting frictional forces acting between the threaded parts 7 and 8 prevents their relative rotation under the action of the spring arm 12, which is not sufficient to overcome this friction and accordingly deflects relative to the pawl 10.

When the service brake is applied, however, the cylinder 1 forces the shoes apart, relieving the strut 6 of the load in the shoe return spring, and the lever 4 can follow up the movement of the trailing shoe T, under the action of the spring arm 12, which rotates the pawl 10 clockwise. If wear compensating adjustment is required, the pawl picks up a tooth on the ratchet wheel 8A, and rotates the nut 8 to effect lengthening of the strut 6. The load exerted by the arm 12 is shared between the pawl 10 and the strut 6, but in the extreme condition, the whole load is exerted upon the pawl 10 to ensure rotation of the nut 8. It will be seen that adjustment of the strut required to compensate for excess wear of the brake linings is effected automatically, during operation of the service brake and under conditions of substantially no load in the strut 6, by movement of the pawl through one tooth space or more.

When the service brake pressure is released, the brake return springs act to return the shoes and the strut 6 and lever 4 to their illustrated positions, and the pawl moves down over the ratchet wheel. The whole of the load in the spring arm 12 is transmitted to the strut, and this force, together with the sliding friction between the relatively rotatable parts of the strut, is sufficient to prevent rotation of the nut in the reverse direction. In the brakes "off" condition, the frictional load imposed by the shoe return springs prevents accidental rotation of the nut due to vibration.

Many variations in the details of the above described arrangement will of course be possible. For example, the pawl need not turn the nut during actuation of the service brake, but could operate during relaxation or partially during both actuation and relaxation.

An alternative form of automatic adjuster is shown in FIGS. 4, 5 and 6. In this case, the pawl comprises a bellcrank lever 110 one arm 111 of which engages in a window 113 in the web 114 of the trailing shoe T. The other arm acts as the pawl proper and extends into proximity with the ratchet wheel 8A. Integral or otherwise fast with the pawl is a spring arm 112 bearing against the back plate and acting to urge the pawl clockwise as viewed in FIG. 5. The force in the spring arm 112 is normally insufficient to rotate the pawl, but when the service brake is operated the spring arm causes the pawl to follow up the shoe T and rotate the nut 8 (if adjustment is necessary) while the strut is relieved of the return spring load.

In this brake, auxiliary actuation is effected through a "-cross-pull" lever 120, whose axis of rotation is parallel with the back plate. With a lever of this type it is usual to arrange for the effort to be applied directly to the strut 6, but in accordance with a feature of the invention, we arrange for the lever to transmit actuating forces to the strut through the intermediary of a third order lever, constituted in this embodiment by a shaft 121 which extends generally perpendicular to the plane of the lever. The lever 120 is secured to the upper end of the shaft 121, the lower end of which is supported in a bracket 122 permitting rotation of the lever and a limited degree of articulation.

Intermediate its ends, the lever passes through a guide block 123, which slides across the back plate and constrains the lever to swinging movement in a plane substantially parallel with the back plate. The guide block is recessed to receive the adjacent end of the strut 6, which abuts the shaft through the intermediary of a slipper block 124.

In operation of the auxiliary brake, the actuator lever 120 is rotated clockwise as viewed in FIG. 5, thus forcing the trailing shoe T to the right, and the upper end of the shaft 121 to the left, pushing the strut 6 and leading shoe L in the same direction. Since the shaft provides a relatively long radius arm, the lever 120 remains substantially in the same plane. It will be understood that the tendency of the trailing shoe to "grab" is reduced by applying the force of the lever 120 nearer the tip of the shoe than would be the case if the lever acted in the plane of the strut 6. Furthermore, the strut 6 is not subjected to bending movements by the lever. The secure attachment of the lever to the shaft 121 also provides good lateral stability of the lever, but the lever could alternatively be journaled on the strut, which would then be mounted nonrotatably.

FIGS. 5A and 5B illustrate a particularly useful detail modification, in accordance with which the lever 120, instead of abutting the back plate B in the "brakes off" position abuts a removal pin 201 inserted in a forked bracket 202 fixed to the back plate. The pin 201 normally limits return movement of the lever 120 under the action of the shoe return spring, but when the brake is to be dismantled for servicing, the pin 201 is removed, thereby permitting extra movement of the lever 120 and consequently further relaxation of the return spring.

The brake shown in FIGS. 4 to 6 also incorporates a novel return spring arrangement which ensures the application to the brake shoes of forces acting to hold them against the back plate B. In this embodiment the brake return spring takes the form of a C-spring 130 having its end portions so shaped that a couple is applied to each shoe about an axis parallel with the center line passing through the cylinder 1 and abutment B of the brake, and offset outwardly of the tips of the shoes. The couple is independent of the shoe return force applied by the spring, which force acts substantially radially of the brake.

As seen in FIGS. 4 and 6, each end portion of the spring 130 is shaped to form a loop 131 which passes through a hole 132 in the web of the shoe from one side of the web, and the free end 133 of the spring bears on the opposite side of the web, so that the base of the loop and the free end 133 bear on opposite sides of the web at positions which are radially offset from each other. The loop portion 131 is, of course, strained upon initial assembly with the shoe webs.

Figure 7:
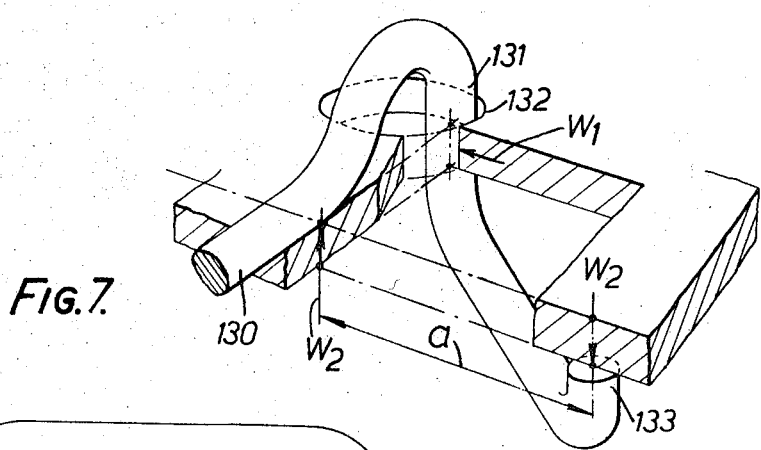

FIGS. 7 to 11 are diagrammatic perspective views, partly broken away, showing some alternative arrangements. In these FIGS. the reactions due to the spring forces acting are indicated by arrows. Shoe return reaction forces are labeled W1, and the holddown reaction forces W2. FIG. 7 shoes an arrangement generally similar to that of FIGS. 4 and 6, but with the loop 131 shaped slightly differently. The holddown couple is seen to be equal to W2.$a$.

Figure 8:
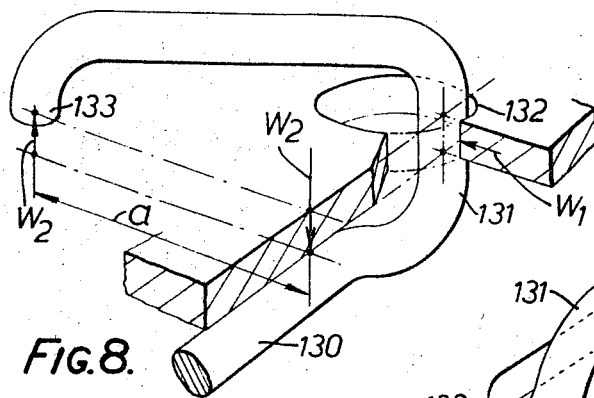

FIG. 8 shows an equivalent arrangement in which the spring 130 is positioned on the opposite, inner side of the shoe (i.e. between the shoe and the back plate).

In the arrangements so far described, the C-spring is free of the back plate B and so may float with the shoes. However, in a brake in which each shoe is free to slide in a line connecting the tips of the shoe, the spring may be anchored to the back plate so that the frictional forces arising from the couple reaction will provide an additional restraint against the shoe floating in this manner when the brake is off. The shoes will, however, become free to float when the brake is applied, because these frictional forces become insignificant compared with the other forces acting on the shoes. Such arrangements are illustrated in FIGS. 9, 10 and 11.

Figure 9:
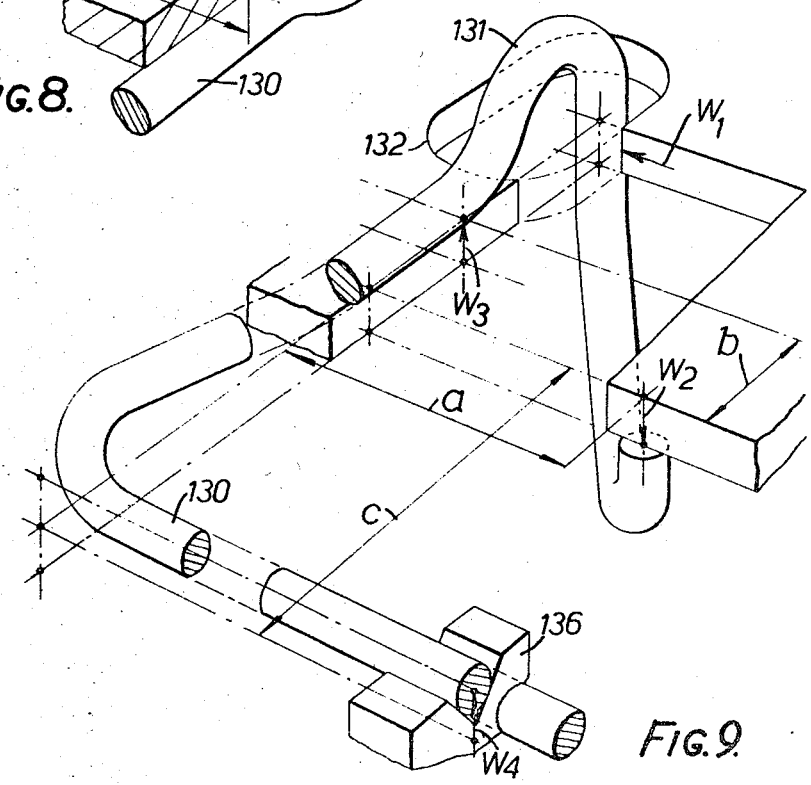

In FIG. 9, the medial portion of the spring 130 is anchored in an abutment 136 fast with the back plate. In this system of forces, W4.$c$ = W3.$b$. The hole 132 is elongated to permit relative movement between the spring and the shoe when the brakes are applied.

Figure 10:
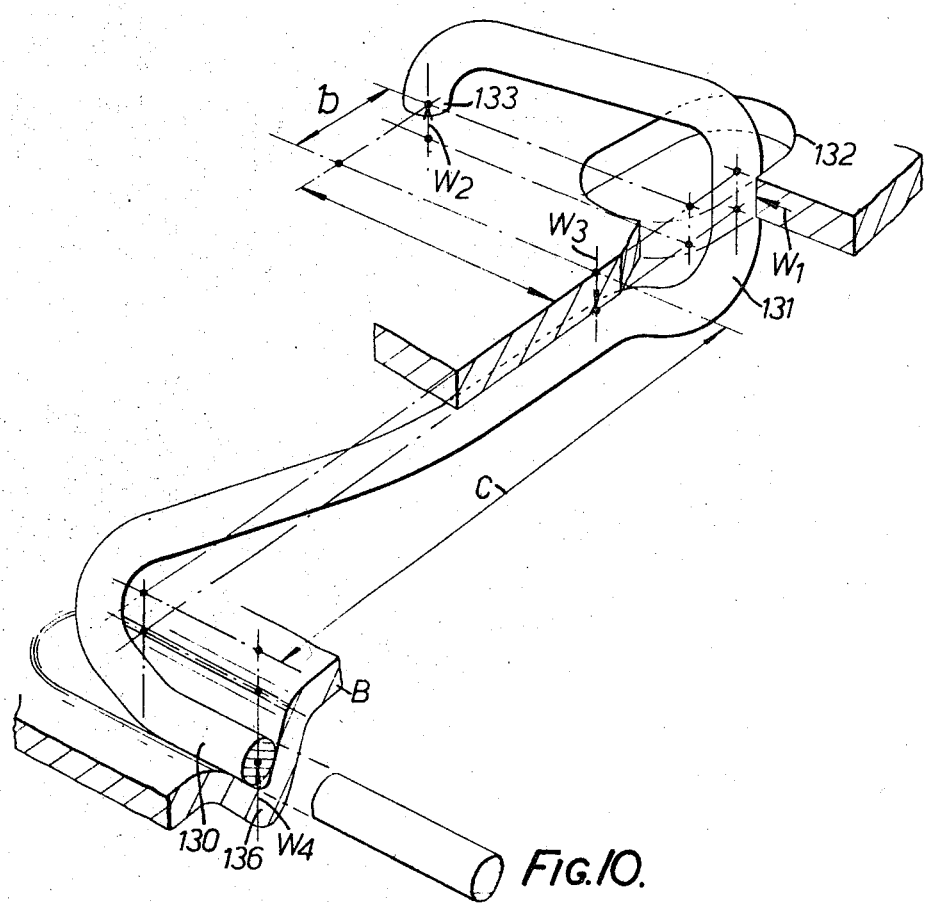

FIG. 10 shoes an equivalent arrangement for the case in which the spring is on the inner side of the shoe web.

Figure 11:
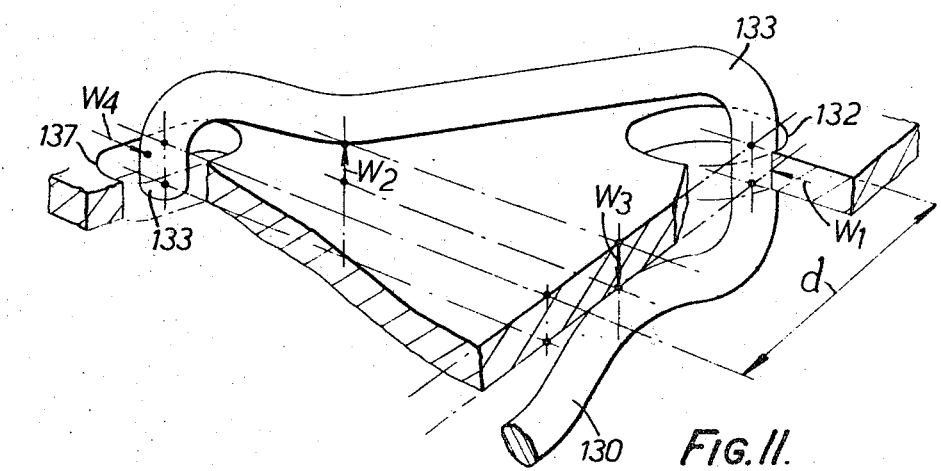

FIG. 11 shoes another arrangement, in which a further couple is applied on a plane at 90° to the couple producing the holddown effect, in order to modify the distribution of forces between the opposite tips of the shoe. This is achieved by providing a further hole 137 in the web to receive the free end of the spring, thereby producing a couple W4.$d$ tending to rotate the leading shoe clockwise as viewed in FIG. 4 to increase the reaction at the leading tip compared with that at the trailing tip. Such an arrangement makes it possible to achieve optimum distribution of shoe tip efforts and optimum stress distribution in the spring 130.

In each of the above-described arrangements it is possible to provide as much stabilizing friction as desired without increasing the shoe return forces, that is to say, without a disproportionate amount of actuating effort being absorbed in overcoming stabilizing friction.

Most of the above described advantages may be obtained by replacing the C-spring with a pair of lead springs one for each shoe, each spring acting between the shoe and a fixed abutment and being suitably shaped and dimensioned at its end portion adjacent the shoe.

Referring again to the automatic adjusters described above, it will be observed that by effecting adjustment as required upon actuation of the service brake, no reliance is placed on frequent use of the auxiliary brake. Experience has shown that most drivers make very infrequent use of the auxiliary brake, so that in an emergency, the auxiliary brake does not work at its maximum efficiency.

In designing the brake, care should be taken to select a tooth pitch on the ratchet wheel which will ensure that, for an angular rotation of the wheel corresponding to a tooth pitch, the equivalent shoe center movement is greater than that due to thermal expansion of the drum.

I claim:

1. An internal shoe drum brake comprising a pair of expansible brake shoes, shoe return spring means for retracting said shoes, power actuated service brake means for expanding said shoes, a strut of adjustable length which transmits manually applied loads between said shoes, said service brake means being operable to relieve said strut of load, said strut comprising a pair of relatively rotatable members screw threaded together, and pawl and ratchet means for effecting relative rotation of said members to length said strut in response to excess travel of said shoes upon actuation of said service brake means, said pawl and ratchet means being effective only when said strut is relieved of load as aforesaid, said pawl and ratchet means comprising a pawl, a ratchet wheel fast with one of said rotatable members of said strut, and including pawl spring means constantly biassing said pawl in a sense to effect adjustment of said strut, said pawl spring means applying to said pawl a force intermediate that required to effect relative rotation of said members when said strut is loaded by said shoe return spring means and that required when said strut is relieved of load by actuation of said service brake means.

2. A brake as claimed in claim 1, wherein said pawl spring means comprises a spring arm fast with said pawl, and means coupling said arm to one of said shoes in such a manner that the spring force applied to said pawl is increased upon brake actuation.

3. A brake as claimed in claim 2, comprising a brake applying lever forming part of said auxiliary brake means, a pivotal connection between said lever and one said brake shoe, said strut acting between said lever and the other said brake shoe, and pivotal connection means mounting said pawl on said lever.

4. In an internal shoe drum brake comprising a rigid back plate carrying a pair of expansible brake shoes, shoe return spring means for retracting said shoes, power actuated service brake means for expanding said shoes, and manually actuated auxiliary brake means for expanding said shoes, said auxiliary brake means comprising an actuating lever connected to one shoe and a strut for transmitting auxiliary actuating forces from said lever to the other said shoe, the improvement which comprises: means mounting said lever for movement about an axis transverse to the axis of the brake; and a third order lever having one end pivotally connected to said back plate and the other end operatively connected to said lever and engaging said strut intermediate the ends of said third order lever for transmitting forces from said actuating lever to said strut.

5. The improved brake of claim 1, including means mounting said third order lever substantially parallel with said back plate, said mounting means including an articulated connection between one end of said third order lever and said backplate and means constraining the other end of said lever to move in a plane substantially parallel with said backplate.

6. The improved brake of claim 4, including a movable abutment having a normal position in which it is engageable by said actuating lever to limit return movement of said actuating lever under the action of said shoe return spring means, said abutment being selectively movable from said position to permit further return movement of said actuating lever.

7. The improved hand brake of claim 5 wherein said actuating lever is directly mounted on the third order lever for rotation about the axis thereof, said actuating lever extending through said back plate to the side thereof remote from said third order lever, said actuating lever being rotatable about its axis of rotation in response to an actuating force applied thereto substantially perpendicular to said back plate.